United States Patent [19]
Gross

[11] 3,747,904
[45] July 24, 1973

[54] APPARATUS FOR AERATING WATER
[76] Inventor: William R. Gross, P. O. Box 510, El Dorado, Kans.
[22] Filed: July 2, 1971
[21] Appl. No.: 159,351

Related U.S. Application Data
[62] Division of Ser. No. 34,244, May 4, 1970.

[52] U.S. Cl. .................................... 261/92, 119/3
[51] Int. Cl. ............................................ A01k 63/00
[58] Field of Search ...................... 119/3, 5; 210/15, 210/8; 261/92

[56] References Cited
UNITED STATES PATENTS
1,985,854   12/1934   Downes ............................ 210/15 X
2,058,785   10/1936   Goudey et al. .................... 210/15 X
1,234,894    7/1917   Fuller .............................. 119/3 UX

*Primary Examiner*—Hugh R. Chamblee
*Attorney*—Schmidt, Johnson, Hovey, Williams & Chase

[57] ABSTRACT

A method and apparatus for raising and harvesting fish utilizes a closed loop for confining a body of water and a paddle wheel to create an artificial current in the body of water of sufficient magnitude to induce fish in the water to swim against the current. Feeding mechanism disposed adjacent the paddle wheel is operable to introduce feed into the water. The artificial current created by the paddle wheel induces fish in the water to swim against the current and toward the food supply. A plurality of air-gathering buckets on the paddle wheel aerate the water to assure an adequate supply of oxygen for the fish. A portion of the closed loop defines an open ended container which is periodically operated to confine a number of fish when the latter have gathered to partake of the food. The container has a curved surface defining its bottom and rotatable structure is disposed longitudinally of the container for rotation over the curved surface to remove any fish confined within the container.

4 Claims, 22 Drawing Figures

PATENTED JUL 24 1973 3,747,904
SHEET 1 OF 4
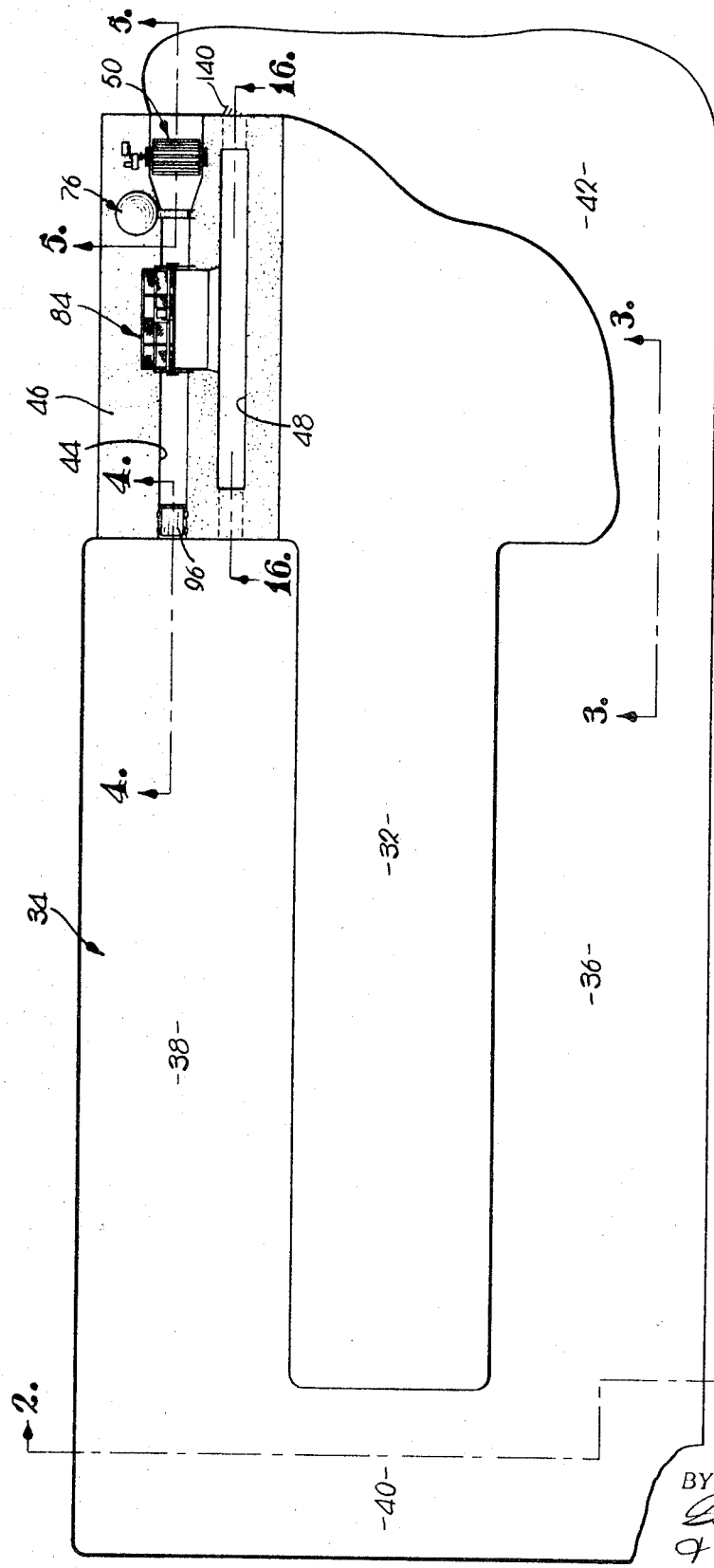
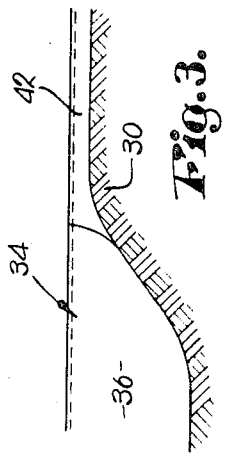
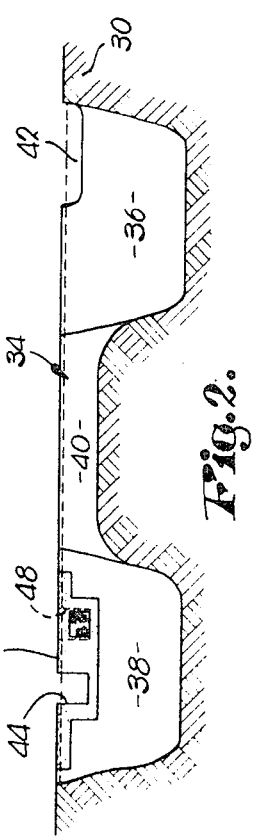
INVENTOR.
William R. Gross
BY Schmidt, Johnson, Hovey & Williams
ATTORNEYS.

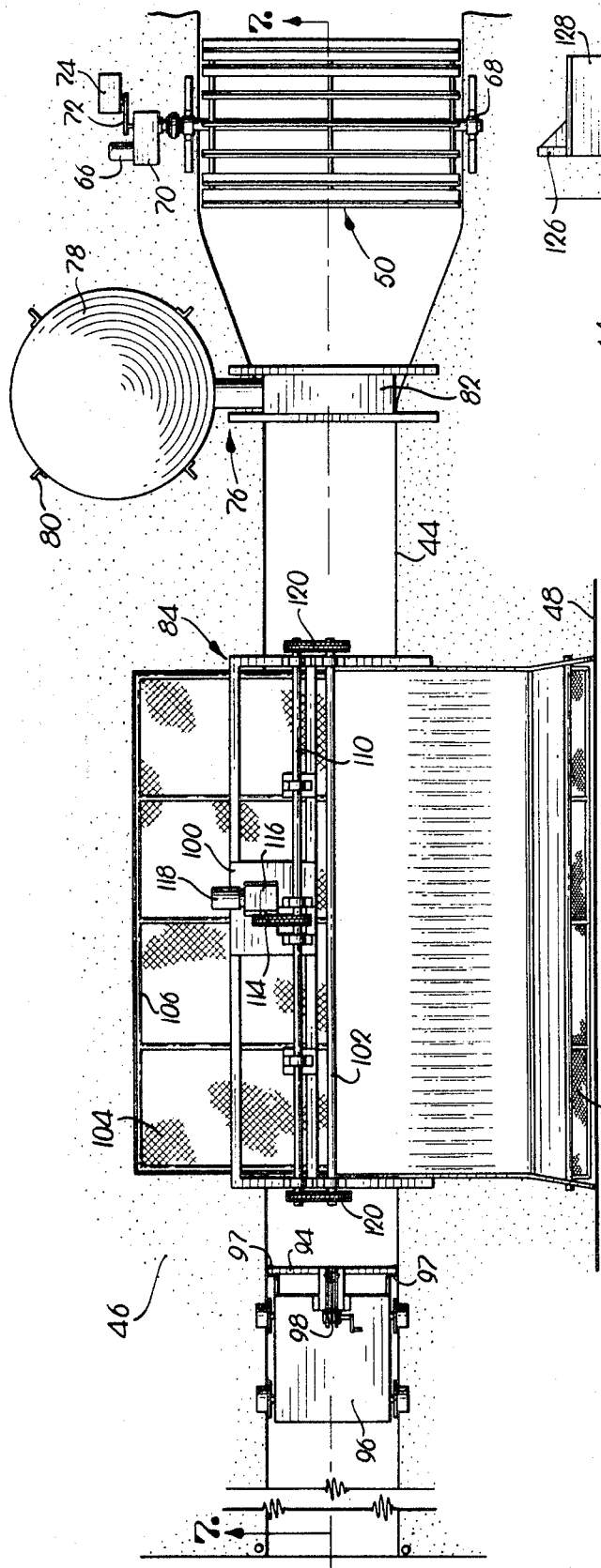
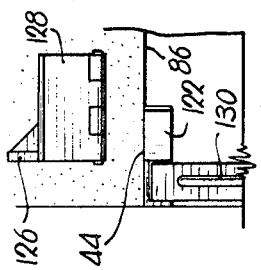
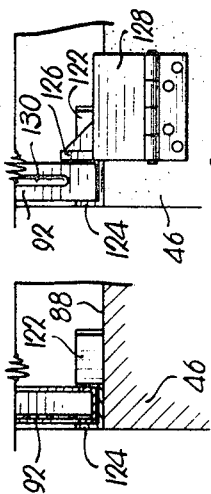
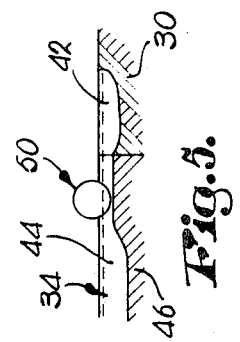
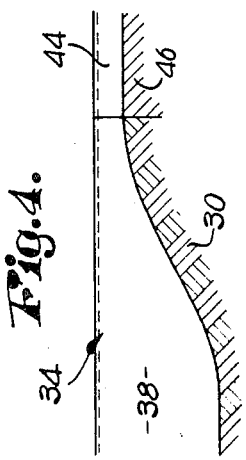

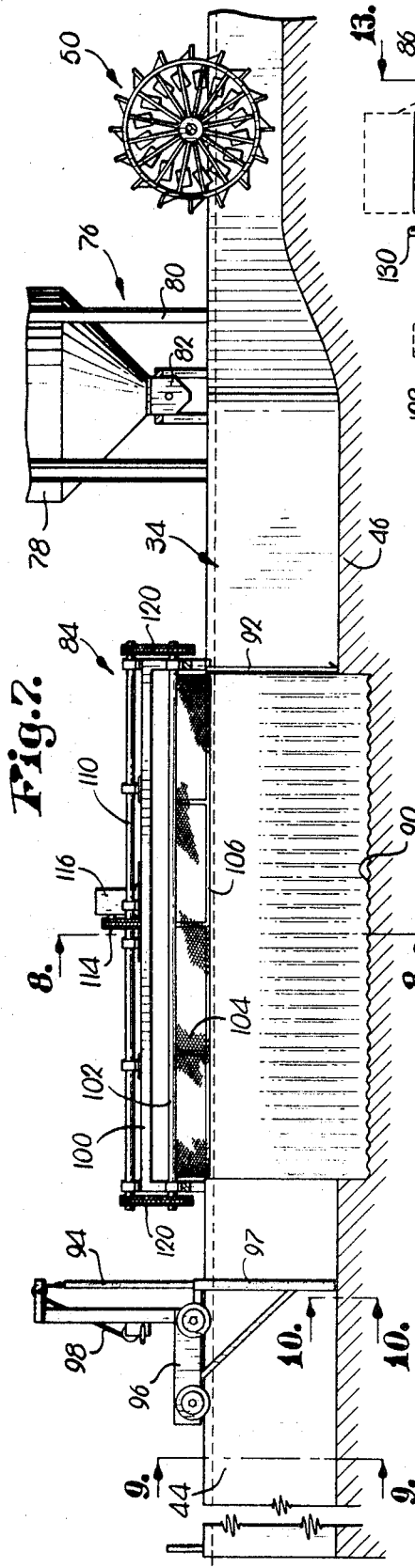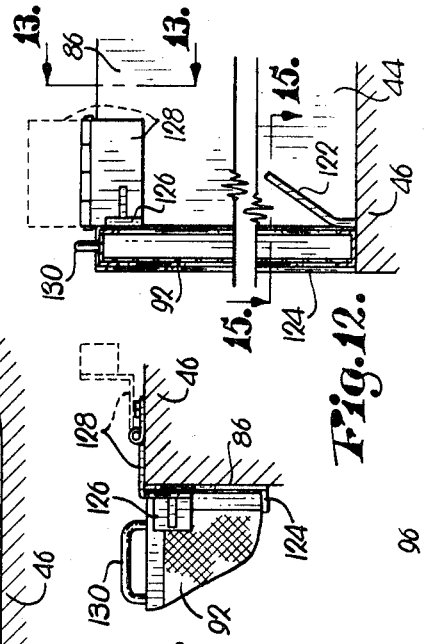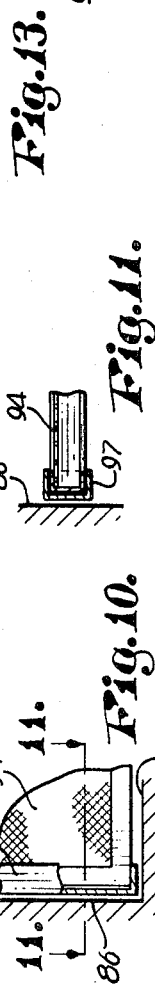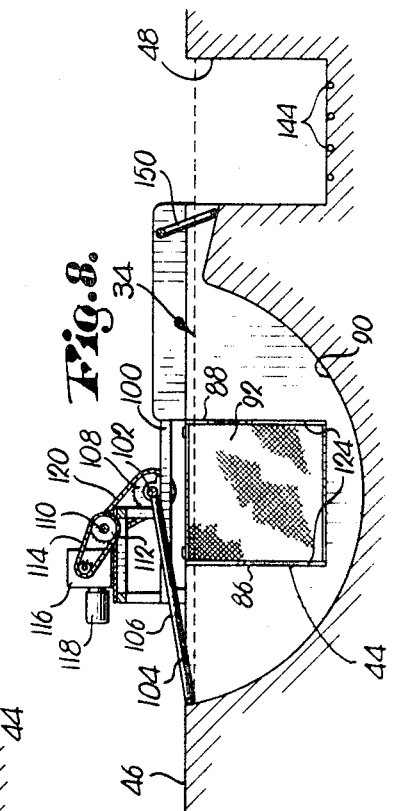

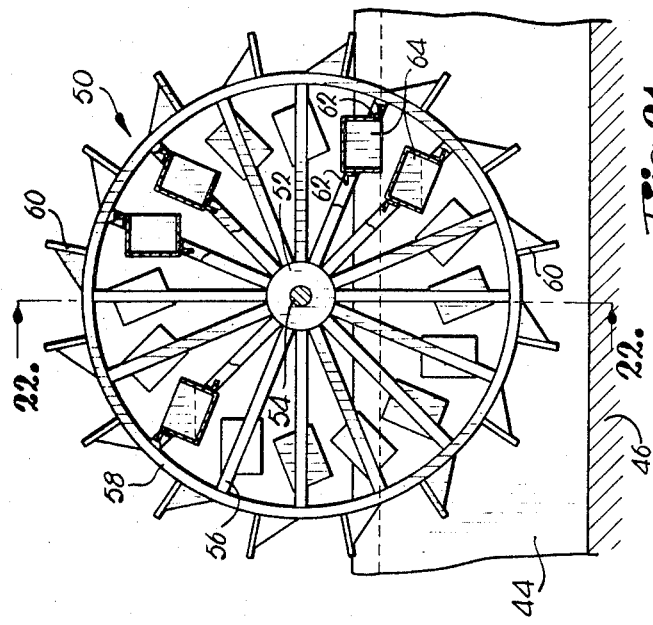
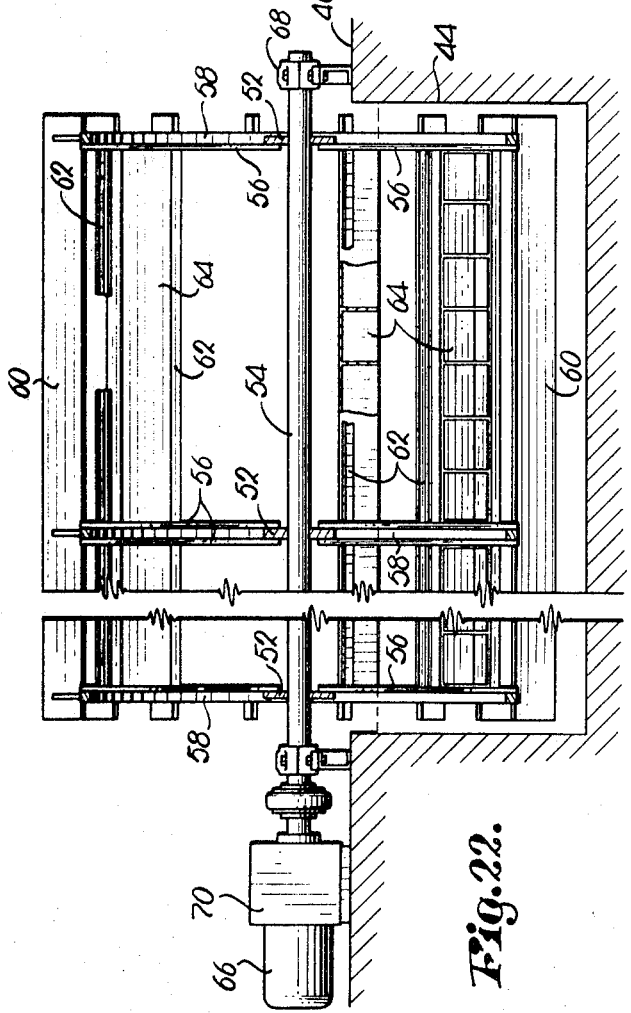
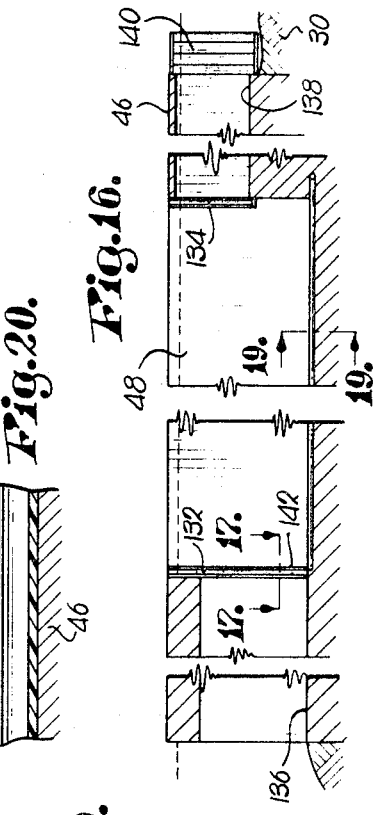
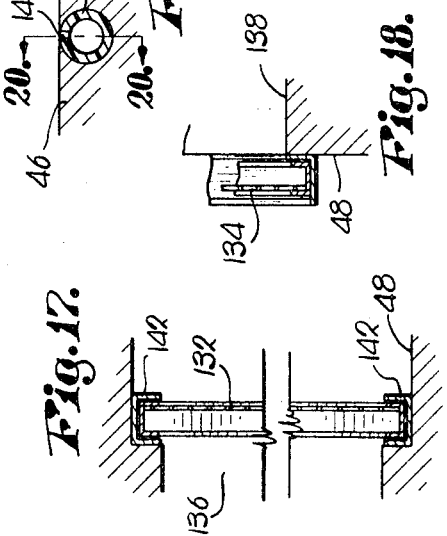

APPARATUS FOR AERATING WATER

This is a division of my copending application Ser. No. 34,244, filed May 4, 1970, entitled METHOD AND APPARATUS FOR RAISING AND HARVESTING FISH.

This invention relates to a method and apparatus for raising and harvesting fish on a commercial scale.

While the controlled raising of fish has long been practiced by government-controlled game commissioners, only recently has considerable interest been shown in the raising of all kinds of fish on a commercial scale. The controlled raising of fish has many advantages over depending upon fishermen to supply the market through their catches from natural sources. These advantages include lower costs, assurance of a uniform supply and control of the size and quality of the fish. Because of the relative youth of the commercial fishing industry prior methods and apparatus for raising fish have been largely limited to confining the fish within a closed body of water and feeding the fish at periodic intervals.

The present invention represents a significant advance over the prior art by providing a method of raising fish wherein the fish are directed to the food source by an artificially created current. This results in the fish eating more food thereby reaching the desired size and weight in a shorter period of time. Growth of the fish is further enhanced by providing mechanism for aerating the water to assure the availability of an adequate supply of oxygen. The invention also provides for harvesting apparatus particularly adapted for use with the feeding apparatus which includes a container for confining the fish when they gather at the food source and structure for removing the confined fish from the container.

It is, therefore, an object of the present invention to provide a method and apparatus for raising fish on a commercial scale which attracts fish to a food supply thereby inducing the fish to eat more and reach maturity in a relatively short time.

Another object of the invention is a method and apparatus for raising fish wherein the water for the fish is continuously aerated to increase the oxygen contact thereof thus enhancing growth of the fish.

Another aim of the invention is a method and apparatus for raising fish which utilizes an auxiliary air supply for the water in which the fish are confined to permit a relatively large number of fish to be raised in a relatively small area.

It is also an object of this invention to provide apparatus for raising fish which includes structure for assuring that the smaller fish always have first access to the food supply thereby promoting their growth and also precluding their being eaten by the larger fish.

An important object of the present invention is also to provide fish-harvesting apparatus for use in conjunction with a method and apparatus as set forth in the preceding objects and which utilizes the attraction of the artificial current-creating means and the food supply adjacent thereto for inducing the fish to enter a closed harvesting container.

A further object of the invention is to provide a fish-harvesting apparatus for use in a moving body of water which has an arcuate surface presenting the bottom of a fish-harvesting container and includes rotatable structure which is operable by a conventional power source to sweep the arcuate surface and remove fish from the harvesting container.

Still another object of the invention is to provide fish-harvesting apparatus which may be placed in natural bodies of water to rid the latter of undesirable trash fish.

In the drawings:

FIG. 1 is a top plan view of means presenting a closed loop for confining a body of water and of the fishers-raising and harvesting apparatus of the present invention positioned relative to the closed loop of water;

FIG. 2 is a cross-sectional view taken along line 2—2 of FIG. 1;

FIG. 3 is a cross-sectional view taken along line 3—3 of FIG. 1;

FIG. 4 is a cross-sectional view taken along line 4—4 of FIG. 1 with portions of the apparatus visible in FIG. 1 being deleted for purposes of illustration;

FIG. 5 is a cross-sectional view taken along line 5—5 of FIG. 1 with the paddle wheel shown in FIG. 1 being represented schematically in FIG. 5;

FIG. 6 is an enlarged plan view of the fish-raising and harvesting apparatus of the present invention illustrating their disposition in relation to the channel-defining portion of the closed loop of water;

FIG. 7 is a vertical cross-sectional view taken along line 7—7 of FIG. 6;

FIG. 8 is a cross-sectional view taken along line 8—8 of FIG. 7;

FIG. 9 is a cross-sectional view taken along line 9—9 of FIG. 7;

FIG. 10 is a cross-sectional view taken along line 10—10 of FIG. 7;

FIG. 11 is a horizontal cross-sectional view taken along line 11—11 of FIG. 10;

FIG. 12 is an enlarged vertical cross-sectional view illustrating the screen member which presents one end of the harvesting container and the manner in which this member is removably held in place;

FIG. 13 is a fragmentary cross-sectional view taken along line 13—13 of FIG. 12;

FIG. 14 is a top plan view of the screen shown in FIG. 12 with one of the screen retainers being illustrated in holding position while the other screen retainer is illustrated is in a released position;

FIG. 15 is a horizontal cross-sectional view taken along line 15—15 of FIG. 12;

FIG. 16 is a cross-sectional view of the holding tank positioned adjacent the harvesting apparatus taken along line 16—16 of FIG. 1;

FIG. 17 is a horizontal cross-sectional view taken along line 17—17 of FIG. 16;

FIG. 18 is a vertical cross-sectional view taken along line 18—18 of FIG. 9;

FIG. 19 is a cross-sectional view taken along line 19—19 of FIG. 16;

FIG. 20 is a cross-sectional view taken along line 20—20 of FIG. 19;

FIG. 21 is an enlarged side-elevational view of the current-creating paddle wheel and its associated air-gathering buckets; and FIG. 22 is a vertical cross-sectional view taken along line 22—22 of FIG. 21.

Referring initially to FIGS. 1–3 of the drawings an excavated section of ground 30 presents a closed loop with an island 32 at its center for confining a closed body of water 34. The loop which confines the body of water 34 includes a pair of relatively deep sections 36 and 38 which are communicated at one end by a somewhat more shallow interconnecting section 40. At the end of the section 36 opposite the interconnection section 40 the closed loop includes a relatively shallow second interconnecting portion 42 which presents a spawning area for fish within the body of water 34. It is to be understood that the spawning area presented by portion 42 will normally have hollow tile or similar structure placed along the bottom to provide a desirable spawning bed for the fish. A relatively shallow, relatively narrow, channel-defining portion 44 of the closed loop is presented by a concrete section 46, and the portion 44 completes interconnection of the two sections 36 and 38. The concrete section 46 also presents a holding area 48 for harvesting fish, which area is in fluid communication with the main body of water 34.

While the volume represented by the body of water 34 is variable over an unlimited range it has been calculated that 1 acre foot of water is capable of supporting 666 pounds of fish per year. Thus, it is contemplated that the deep sections 36 and 38 will each have a depth of approximately 35 feet and the portions 42 and 44 will each have a depth of from 4 to 5 feet.

As best illustrated in FIGS. 6, 21 and 22, apparatus for creating an artificial current in the body of water 34 comprises a paddle wheel which is designated generally by the numeral 50. The paddle wheel 50 comprises a set of 3 hubs 52 each mounted upon a shaft 54 and each having a plurality of spokes 56 extending outwardly from a respective hub 52 with a circumscribing rim 58 enclosing each set of spokes 56. A plurality of transversely disposed paddle components 60 are mounted on the outside of the three rims 58. A pair of angle irons 62 extend transversely of the paddle wheel at each spoke 56 for supporting a plurality of air-gatherin buckets 64. As best illustrated in FIG. 22, one end of the shaft 54 is coupled with an appropriate power source such as an electric motor 66 and the other end of the shaft 54 is journaled in a housing 68 supported by the concrete section 46.

The motor 66 turns a plurality of reduction gears contained within a housing 70 which transfer power to the shaft 54 to rotate the paddle wheel 50. As illustrated in FIG. 6, a drive shaft extending from the gearbox housing 70 turns a belt 72 trained therearound which in turn drives an air compressor 74 for purposes to be made clear hereinafter.

Referring now to FIGS. 6 and 7 wherein a feeding mechanism is designated generally by the numeral 76 and includes an upright storage hopper supported by a plurality of upright standards 80, the storage hopper 78 communicating with a feed trough 82 which spans the channel-defining portion 44. It is to be understood, of course, appropriate feed delivery mechanism such as an auger (not shown) is disposed within the feeding trough 82 to transfer feed from the storage hopper 78 to the trough. A longitudinally-extending slot or a plurality of openings are normally provided in the bottom of the trough 82 for introducing feed into the body of water 34. It is also contemplated that the entire feeding mechanism 76 will normally be controlled by a timed electric motor to automatically supply food to fish within the water 34 at periodic intervals.

Reference is now made to the harvesting apparatus of the invention which is designated generally by the numeral 84 and best illustrated in FIGS. 6-8. The harvesting apparatus includes a container for confining a number of fish which is presented by side walls 86 and 88 of the concrete section 46 with the bottom being presented by an uninterrupted longitudinally-extending corrugated curved surface 90 of semi-circular cross-section. The container presented by side walls 86 and 88 and corrugated curved surface 90 has an open end which is positioned in the direction of movement of the body of water 34 whereby fish swimming in the opposite direction against the artificial current may ingress into the container. The end of the container opposite the open end is closed by a suitable screen 92 having openings therein of a size sufficient to permit the passage of water therethrough while confining the fish. The opened end of the container is closed by a gate 94 mounted upon a movable support in the form of a trolley 96. As is clear from viewing FIGS. 6 and 9, the trolley 96 is in turn supported by the concrete section 46. The gate 94 is movable into and out of the channel-defining portion 44 along a vertically-disposed guide frame 97 by a suitable winch and pulley arrangement 98.

A platform 100 supports a longitudinally extending shaft 102 disposed centrally of the semi-circular bottom surface 90 adjacent the uppermost leading edge of the harvesting container. Rotatable structure in the form of a mesh screen 104 secured to a frame 106 is rigid with the shaft 102 for rotation therewith and extends from the shaft into engagement with the curved surface 90. A pair of sprockets such as 108, visibile in FIG. 8, disposed at opposite ends of the shaft 102, are rigid with the latter and turn the same through a drive mechanism which includes a drive shaft 110, a drive sprocket 112, a drive belt 114, a gear reduction box 116, and an electric motor 118. Each of the sprockets 108 is coupled with the drive shaft 110 by an appropriate sized chain 120.

While the screen 92 was referred to generally above as a part of the harvest apparatus 84 details of the construction of the screen and its associated retaining components will now be described with reference to FIGS. 12-15, it being understood that the screen 92 and the associated retaining components also function as a part of the feeding mechanism 76. A pair of angularly disposed retaining brackets 122 (FIGS. 12 and 15) which extend upwardly from the bottom of the channel-defining portion 44 maintain the bottom of the screen 92 in disposition against a pair of angle irons 124 secured to the respective side walls 86 and 88. A second pair of retainers 126 for maintaining the top of the screen 92 in disposition against the angle irons 124 are mounted upon hinges 128 and are movable to the positions illustrated in broken lines in FIGS. 12 and 13. In FIG. 14 one of the hinges 128 is illustrated in its screen-retaining position while the other hinge 128 is illustrated in its screen-releasing position. A pair of handles 130 at the top of the screen 92 permit easy removal of the same when the hinges 128 have been moved to their releasing position.

Referring now to details of construction of the holding area 48, illustrated in FIGS. 8-9, and 16-20, it is seen that the holding area is presented by a relatively shallow portion of the concrete section 46 and is in fluid communication with the body of water 34 as a result of screens 132 and 134 disposed at opposite ends and connecting conduits 136 and 138 (FIG. 16) which extend beneath the surface of the concrete section 46. A plurality of directional vanes 140 at the end of the conduit 138 project outwardly into the relatively shallow portion 42 to direct water through the area 48. As best illustrated in FIG. 17, the screen 132 is held within the area 48 by a pair of channel irons 142 which permit reciprocation of the screen 132 along a rectilinear path into and out of the water within the holding area 48 in the manner illustrated in FIG. 9. It is to be understood that the screen 134 is similarly retained at the other end of the holding area 48 for vertical reciprocable movement.

As clearly illustrated in FIGS. 19 and 20, a plurality of air conduits such as 144, each having a plurality of openings 146, are disposed along the bottom of the holding area 48. As best illustrated in FIG. 8, the holding area 48 is communicated with the container presented by side walls 86 and 88, screen 92, gate 94, and corrugated curved surface 90 through an interconnecting structure 148 at a leading edge of the curved surface 90. A rotatable divider 150 is movable in the direction of holding area 48 to allow fish to enter the same from the container, but is limited in its movement in the opposite direction by the structure 148. Also, as illustrated in FIG. 9, a plurality of the conduits 144 are imbedded in the bottom of the channel-defining portion 44. Each of the conduits 144 is coupled with the air compressor 74 for aerating the water and assuring that an adequate supply of oxygen is alway available to the fish.

In operation, with the closed loop confining the body of water 34 having a number of fish therein, the paddle wheel 50 is rotated to create an artificial current in the body of water 34. Although the speed of the current may vary, it is preferable that it be at least 3 miles per hour. As the paddle wheel 50 rotates, the air-gathering buckets 64 are successively exposed to the atmosphere and then immersed in the body of water 34. Thus, the buckets 64 gather air from the atmosphere and deposit this air within the water to enhance the oxygen supply therein. It is to be noted from viewing FIG. 21 that the buckets 64 are positioned to engage the surface of the water 34 in a horizontal plane so as to preclude the escape of any air as the bucket is submerged. While it has generally been found sufficient to construct the buckets as illustrated in the drawings it may be desirable in certain instances to provide a plurality of openings in the bottoms of the buckets to drain water trapped therein. Without such openings, however, the buckets 64 are emptied prior to reaching the surface of the body of water 34 by the upside down disposition thereof and the absence of any openings increases the air-gathering capacity.

The artificial current created in the body of water 34 is of sufficient magnitude to induce fish in the water to swim against the current. It has been discovered that this tendency to swim against the current is present in nearly all species of fish. Thus, the fish are attracted to the area beneath the feeding mechanism 76 which is positioned to introduce feed into the water downstream from the paddle wheel 50 the latter being the point of origin of the artificial current. The feed is periodically introduced into the body of water 34 from the feeding mechanism 76 and because fish are always attracted to the feeding area they eat more food than would otherwise be the case. The continuous aerating of the water through the use of the air-gathering buckets 64 as well as conduits 144 and air compressor 74 provides the increased oxygen which the fish require to utilize the increased food supply. The paddle wheel 50 also circulates the body of water 34 in the closed loop to prevent stagnation.

It is also to be appreciated that provision of the screen 92 in the channel-defining portion 44 serves to restrain the larger fish in the body of water 34 at a distance removed from the feeding mechanism 76 while permitting the smaller fish in the water to move toward the feeding mechanism whereby when the latter is operated to introduce feed into the water the smaller fish have first access to the feed. This separation of the larger and smaller fish also precludes the latter being eaten by the former. The extent to which separation of the larger and smaller fish is achieved is, of course, dependent upon selection of the proper-sized screen 92. The feeding mechanism 76 is normally adjusted to assure that no food enters the area beyond the channel portion 44. In this manner the fish are always induced to enter the area of the harvesting apparatus. The passage of water over the corrugated surface 90 creates a turbulence in the bottom of the harvesting container which precludes the settling of food therein.

When it is desired to harvest fish from the body of water 34, the gate 94, which is normally in the position shown in FIG. 7, is lowered into the position illustrated in FIG. 9, and the trolley 96 pushed forwardly in the direction of the feeding mechanism 76 to close the open end of the harvesting container. This, of course, will normally be done simultaneously with the introduction of feed from the mechanism 76 to assure that a maximum number of fish are located in the area of the harvesting apparatus 84. The gate 94 serves as a prod to move any fish in the channel-defining 44 into the interior of the harvesting container. Once the gate 94 is positioned against the end of the container to close the same, the motor 118 is actuated to move the screen 104 over the curved surface 90 to lift fish confined within the container upwardly until the fish slide down the interconnecting structure 148 and past the divider 150 into the holding area 48. The provision of air conduits 148 in both the harvesting container and the holding area 48 assures an adequate supply of oxygen for the large concentration of fish present during the harvesting operation.

Thus, it is to be appreciated that the present invention also contemplates a method of raising and harvesting fish which includes providing a closed loop of water for confining the fish; creating an artificial current in the body of water of sufficient magnitude to induce the fish in the water to swim against the current and circulate the water while preventing stagnation of the same; providing a source of feed for the fish adjacent the point of origin of the artificial current; introducing feed from the source into the body of water; and selectively operating a harvesting apparatus positioned adjacent the feed source at periodic intervals during introduction of feed into the body of water.

While the invention has been described with reference to an excavated section of earth which presents a closed loop for confining a body of water, it is to be understood that a large tank or other man-made structure could be substituted for the earth-excavated closed loop. Because of the desired size of the body of water 34, however, it is contemplated that in the majority of cases it will be desirable to construct the apparatus as illustrated in the drawings.

It is also contemplated that the invention will find use in rivers for harvesting fish therein. Of particular importance in this latter application is the use of the invention to clear rivers and lakes of so-called "trash" fish which are invariably present and which limit the number of game fish that the body of water can support. In this instance the apparatus of the invention would be mounted on a sinkable barge with the open end of the harvesting apparatus positioned in the direction of current flow. Fish are then harvested in the manner previously described with the trash fish being removed for commercial purposes and the game fish being returned to the water.

Having thus described the invention, what is claimed as new and desired to be secured by Letters Patent is:

1. Apparatus for aerating a body of water comprising:
   rotatable means partially submerged in said body of water and extending above and below the surface of the latter with the axis of rotation of the rotatable means being located above the surface level of said body of water;
   air entrapping means carried by said rotatable means for rotation with the latter,
   said entrapping means including a plurality of substantially imperforate, horizontally disposed bucket means each having an open extremity and a closed extremity,
   said bucket means being disposed in relatively closely spaced relationship within an annular zone generally circumscribing said axis of rotation of said rotatable means and spaced from said axis sufficiently for each bucket means to move repeatedly between positions above and below said surface as said rotatable means is rotated, there being a plurality of said bucket means in each quadrant of said annular zone,
   said bucket means being similarly oriented with respect to said axis and one arcuate direction of rotation of said rotatable means, with said open extremities of said bucket means facing in said one direction of rotation; and
   means operably coupled with said rotatable means for driving the latter to rotate the same in said one direction of rotation,
   whereby, as said rotatable means is thus rotated, said bucket means will successively and repeatedly entrap air therein while above said surface, will carry said entrapped air beneath said surface, and will release said entrapped air beneath said surface to aerate said body of water.

2. In apparatus as set forth in claim 1, wherein said driving means includes a prime mover independent of any movement of water within said body.

3. In apparatus as set forth in claim 2, wherein is provided water agitating paddle means carried by said rotatable means outwardly of said bucket means from said axis, whereby water adjacent the regions where said entrapped air is released beneath said surface is agitated to enhance aeration.

4. In apparatus as set forth in claim 1 wherein said bucket means each have opposed horizontal edges defining a part of said open extremity thereof, said edges of each bucket means being oriented to substantially simultaneously contact said surface of the body of water as a respective bucket means enters the water during rotation of said rotatable means, and the bucket means being located in relative dispositions causing the space between adjacent bucket means to be less than the effective depth of each proximal pair thereof.

* * * * *